(12) United States Patent
Hutton et al.

(10) Patent No.: US 12,037,202 B2
(45) Date of Patent: Jul. 16, 2024

(54) CONVEYOR BELT CLEANER

(71) Applicant: ESS Engineering Services & Supplies Pty Limited, Currumbin (AU)

(72) Inventors: Michael James Hutton, Currumbin (AU); Kenneth Andrew Minch, Currumbin (AU)

(73) Assignee: ESS Engineering Services & Supplies Pty Limited, Currumbin (AU)

( * ) Notice: Subject to any disclaimer, the term of this patent is extended or adjusted under 35 U.S.C. 154(b) by 115 days.

(21) Appl. No.: 17/781,079

(22) PCT Filed: Aug. 20, 2021

(86) PCT No.: PCT/AU2021/050925
§ 371 (c)(1),
(2) Date: May 31, 2022

(87) PCT Pub. No.: WO2022/036409
PCT Pub. Date: Feb. 24, 2022

(65) Prior Publication Data
US 2023/0002170 A1    Jan. 5, 2023

(30) Foreign Application Priority Data

Aug. 20, 2020   (AU) ............................... 2020902973

(51) Int. Cl.
*B65G 45/12*   (2006.01)
(52) U.S. Cl.
CPC ................... *B65G 45/12* (2013.01)
(58) Field of Classification Search
CPC ......... B65G 45/12; B65G 45/14; B65G 45/16

USPC .................................................. 198/497–499
See application file for complete search history.

(56) References Cited

U.S. PATENT DOCUMENTS

| | | | | |
|---|---|---|---|---|
| 4,598,823 | A * | 7/1986 | Swinderman | B65G 45/12 198/497 |
| 4,643,293 | A * | 2/1987 | Swinderman | B65G 45/16 198/497 |
| 5,301,797 | A * | 4/1994 | Hollyfield, Jr. | B65G 45/12 198/499 |
| 6,354,428 | B1 * | 3/2002 | Gibbs | B65G 45/16 198/497 |

(Continued)

FOREIGN PATENT DOCUMENTS

WO    2006058179 A2    6/2006

OTHER PUBLICATIONS

Australian Patent Office; Search Report in related International Patent Application No. PCT/AU2021/050925 dated Oct. 25, 2021; 4 pages.

*Primary Examiner* — Gene O Crawford
*Assistant Examiner* — Keith R Campbell
(74) *Attorney, Agent, or Firm* — Wood Herron & Evans LLP

(57) ABSTRACT

A scraper blade mounting assembly for a conveyor belt cleaner including; at least one scraper blade; a support cartridge arranged to removingly fix the at least one conveyor belt cleaner scraper blade; wherein a top surface of the support cartridge includes an engaging element for receiving the at least one conveyor belt cleaner scraper blade; and wherein the engaging element is arranged to restrain sliding movement of the at least one along the length of the support cartridge.

19 Claims, 8 Drawing Sheets

(56) References Cited

U.S. PATENT DOCUMENTS

| | | | |
|---|---|---|---|
| 6,581,754 B2 * | 6/2003 | Law | B65G 45/12 15/256.51 |
| 7,216,756 B2 * | 5/2007 | Swinderman | B65G 45/16 198/499 |
| 7,370,750 B2 * | 5/2008 | Swinderman | B65G 45/16 198/497 |
| 9,169,081 B1 | 10/2015 | Harrison et al. | |
| 11,225,383 B2 * | 1/2022 | Schwarze | B65G 45/16 |
| 2008/0023298 A1 * | 1/2008 | Davidts | B65G 45/16 198/495 |
| 2013/0026008 A1 | 1/2013 | Childs et al. | |

\* cited by examiner

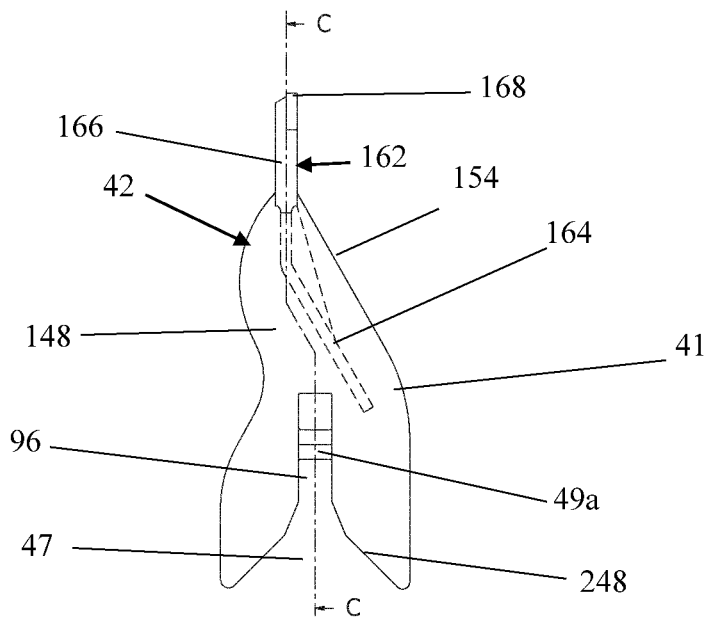
Figure 8
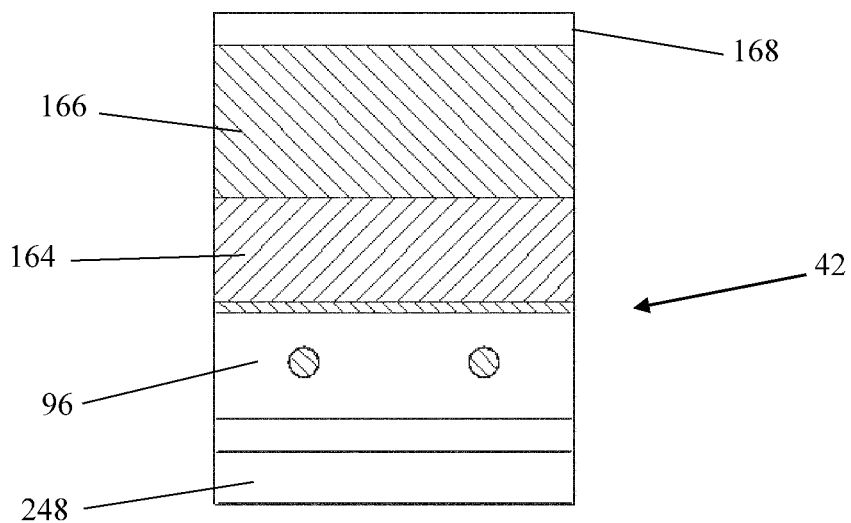
9 Figure

CONVEYOR BELT CLEANER

FIELD

The present invention generally relates to a conveyor belt cleaner.

BACKGROUND

The present invention is directed to a scraper blade mounting assembly for a conveyor belt cleaner, and in particular to a scraper blade mounting assembly including one or more scraper blades removably mounted to a cartridge wherein the cartridge is mounted on a support cross shaft, such that the scraper blades are easily removed, are shaped to minimise the build-up of scraped material on the scraper blades.

Conveyor belt cleaners include scraper blades that engage a moving conveyor belt to remove conveyed material that continues to adhere to the belt after the remainder of the conveyed material has been discharged. Scraper blades wear or become damaged during use and periodically require replacement. Conveyors are typically shut down when scraper blades require replacement so that service personnel can obtain access to the scraper blades for removal and replacement while avoiding injury that could potentially occur if the conveyor belt were moving. Conveyor belt cleaners also often require service due to a buildup of the conveyed material on the scraper blade after the material has been removed from the belt which decreases the cleaning efficiency of the scraper blade. The present invention allows the fast, efficient removal and replacement of scraper blades without needing to move the scraper blades along the length of the mounting cartridge and reduces material buildup on the scraper blades to provide increased cleaning efficiency over the life of the scraper blades.

Existing conveyor belt cleaners, such as the one described in U.S. Pat. No. 6,581,754, the contents of which are herein incorporated by reference, have several limitations. The blades of this prior art cleaner can seize/bind during removal due to the build up of fines in the horizontal track within which the blades slide. They require the scraper blades to slide along the length of the cartridge for removal. They have a large extended footprint due to the inclusion of stiffeners. They can allow the build-up of material on the rear surfaces of blades where horizontal surfaces are present.

Reference to cited material or information contained in the text should not be understood as a concession that the material or information was part of the common general knowledge or was known in Australia or any other country.

SUMMARY OF INVENTION

It is an object of this invention to provide to ameliorate, mitigate or overcome, at least one disadvantage of the prior art, or which will at least provide the public with a practical choice.

In a first embodiment, the present invention seeks to provide a scraper blade mounting assembly for a conveyor belt cleaner including; at least one scraper blade; a support cartridge arranged to removingly fix the at least one conveyor belt cleaner scraper blade; wherein a top surface of the support cartridge includes an engaging means for receiving the at least one conveyor belt cleaner scraper blade; and wherein the engaging means is arranged to restrain sliding movement along the length of the support cartridge.

Preferably, the engaging means includes a plurality of teeth extending from the top of the support cartridge and angled with respect to the longitudinal extension of the support cartridge.

Preferably, the engaging means includes a space between adjacent teeth of the plurality of teeth; and wherein the space is arranged to receive a pin in the base of the at least one scraper blade to retain the at least one scraper blade on the engaging means.

Preferably, the scraper blade mounting system for a conveyor belt cleaner includes a locking means, wherein the locking means is arranged to engage one end of the at least one scraper blade to fix the at least one scraper blade in place.

Preferably, the locking means is a cam lock.

Preferably, the support cartridge has a square tube profile; and wherein a corner of the square tube profile includes the engaging means.

Preferably, the engaging means is a stiffener.

Preferably, the scraper blade includes no horizontal surfaces in use.

Preferably, the scraper blade mounting system for a conveyor belt cleaner includes a plurality of scraper blades.

BRIEF DESCRIPTION OF DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 8 is an end view of the conveyor belt cleaner of FIG. 6;

FIG. 9 is a view along the lines C-C in FIG. 8; and

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
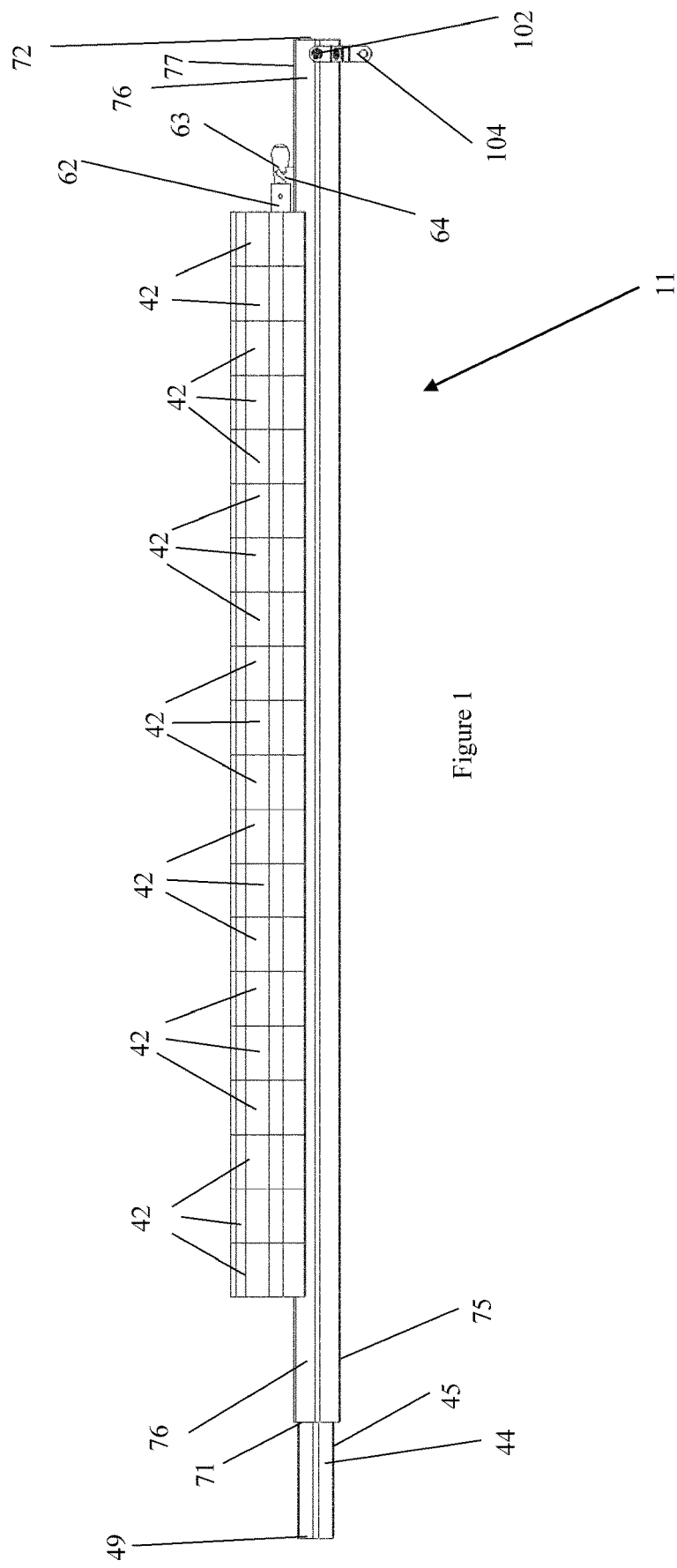
FIG. 1 is a front view of a conveyor belt cleaner according an embodiment of the present invention.

The present invention according to the first embodiment is in the form of a scraper blade mounting assembly 11 for a conveyor belt cleaner of the present invention, as shown in FIG. 1, is adapted to be removably mounted to a stationary structure such as a conveyor chute housing. The scraper blade mounting assembly 11 is disposed beneath the return run of a conveyor belt.

The scraper blade mounting assembly 11 which is adapted to removably mount one or more scraper blades 42 to the conveyor chute housing. The scraper blade mounting assembly 11 includes a generally linear and elongate cross shaft 44. The cross shaft 44 includes a central axis that extends between a first end 49 and a second end 50. The cross shaft 44 is formed as a square tube having a hollow rectangular bore extending from the first end 49 to the second end 50. The cross shaft 44 is positioned in use so that a bottom cross shaft corner 45 of the rectangular or square tube forming the cross shaft 44 is at the base of the cross shaft 44. Side cross shaft corners 46 each include apertures (not shown) located adjacent the second end 50 of the cross shaft 44. As the apertures are located in side corners 46 of the square tube cross shaft 44, they are located coaxially across from one another.

The mounting assembly 11 also includes an elongate cartridge 76 that extends generally linearly between a first end 72 and a second end 71. The cartridge 76 is in the form of a square tube with a square bore adapted to slidably receive the cross shaft 44. The cartridge 76 is aligned so that a lower cartridge corner 75 is at the base of the cartridge 76. Side cartridge corners 74 each include apertures 73 located adjacent the second end 72 of the cartridge 76. As the apertures 73 are located in side cartridge corners 74 of the cartridge 76, they are located coaxially across from one another.

Figure 2:
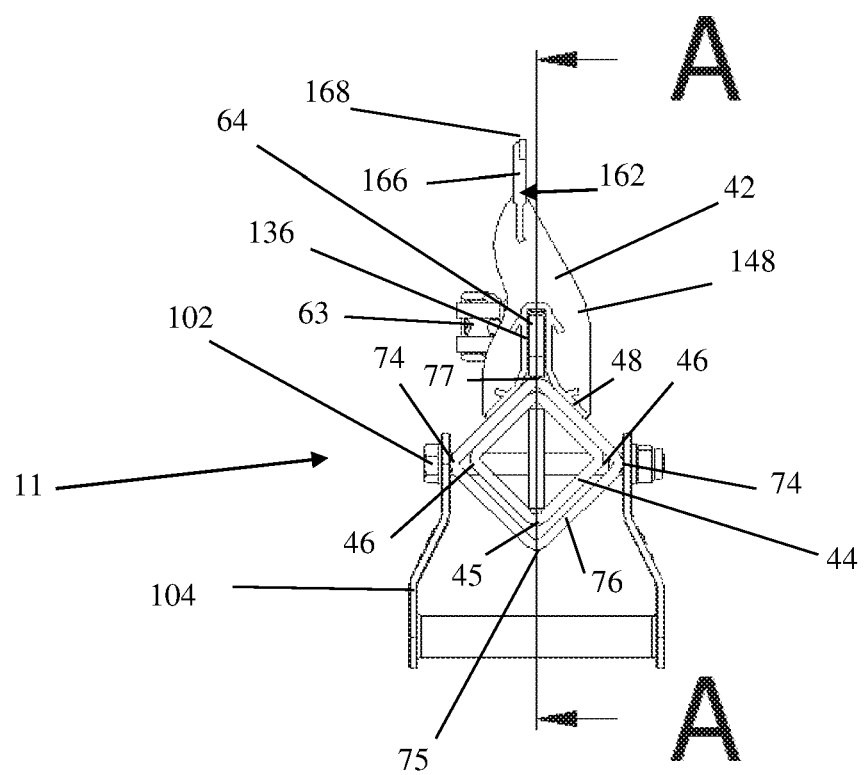
FIG. 2 is an end view of the conveyor belt cleaner of FIG. 1.
Figure 3:
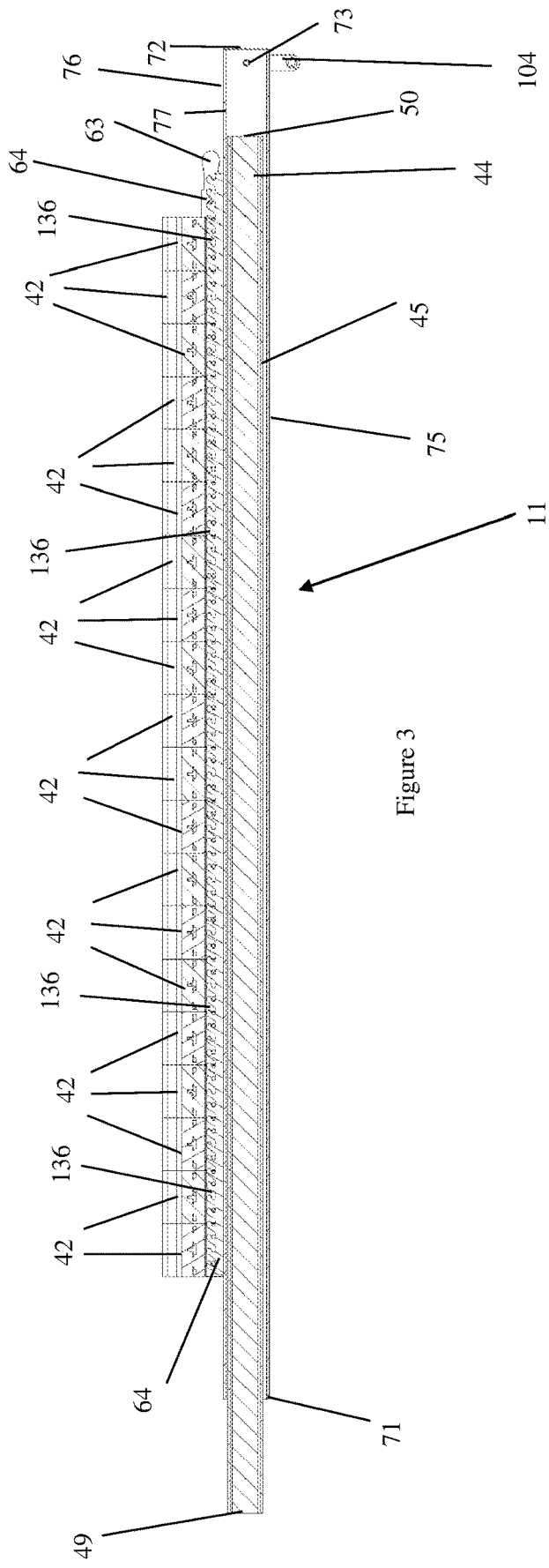
FIG. 3 is a view along lines A-A in FIG. 2.
Figure 6:
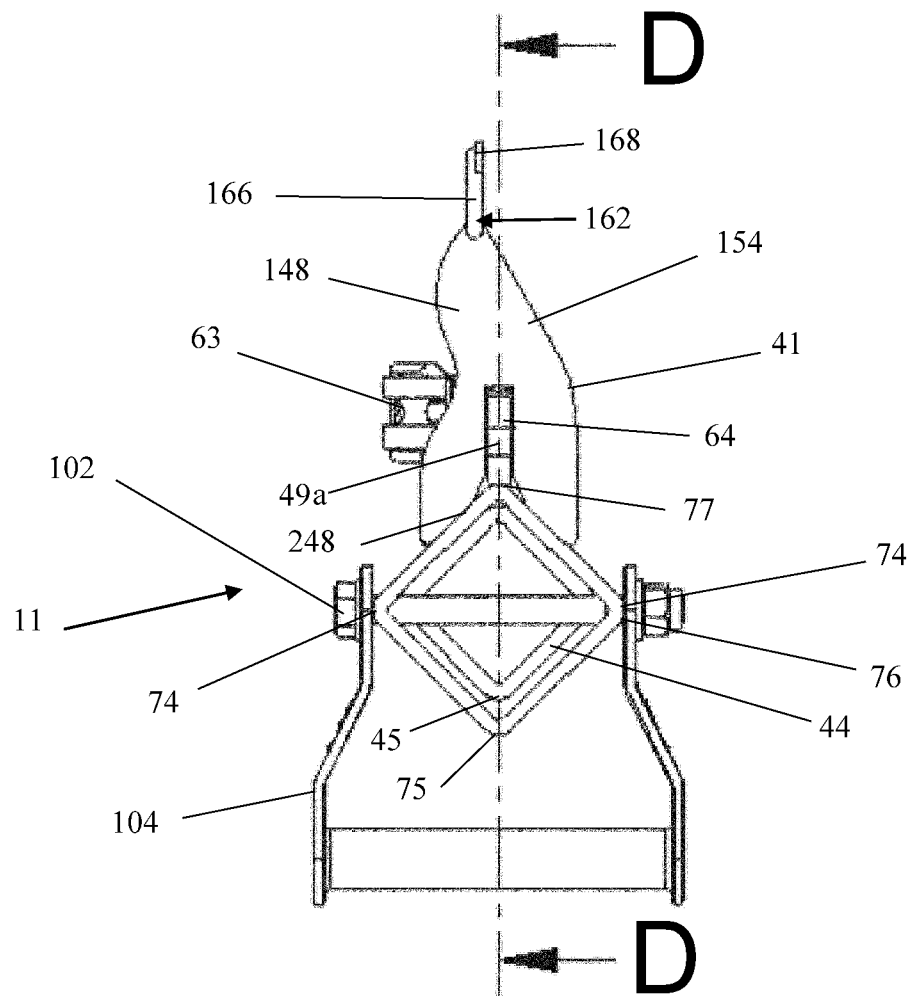
FIG. 6 is an alternative embodiment of the conveyor belt cleaner of FIG. 2.
Figure 7:
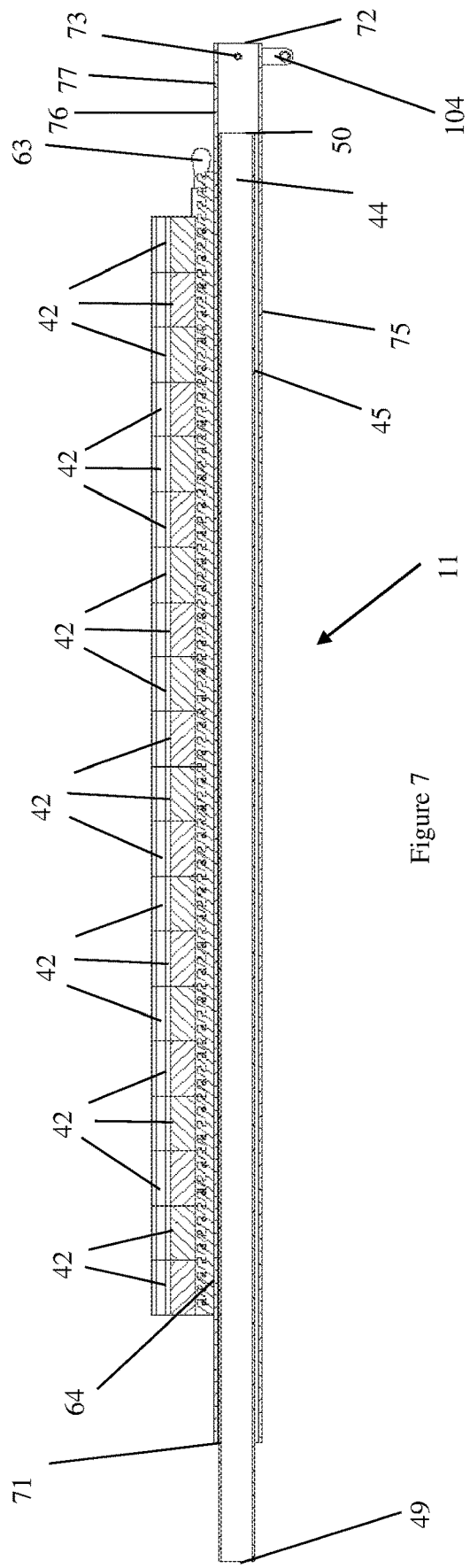
FIG. 7 is a view along lines D-D in FIG. 6.
Figure 10:
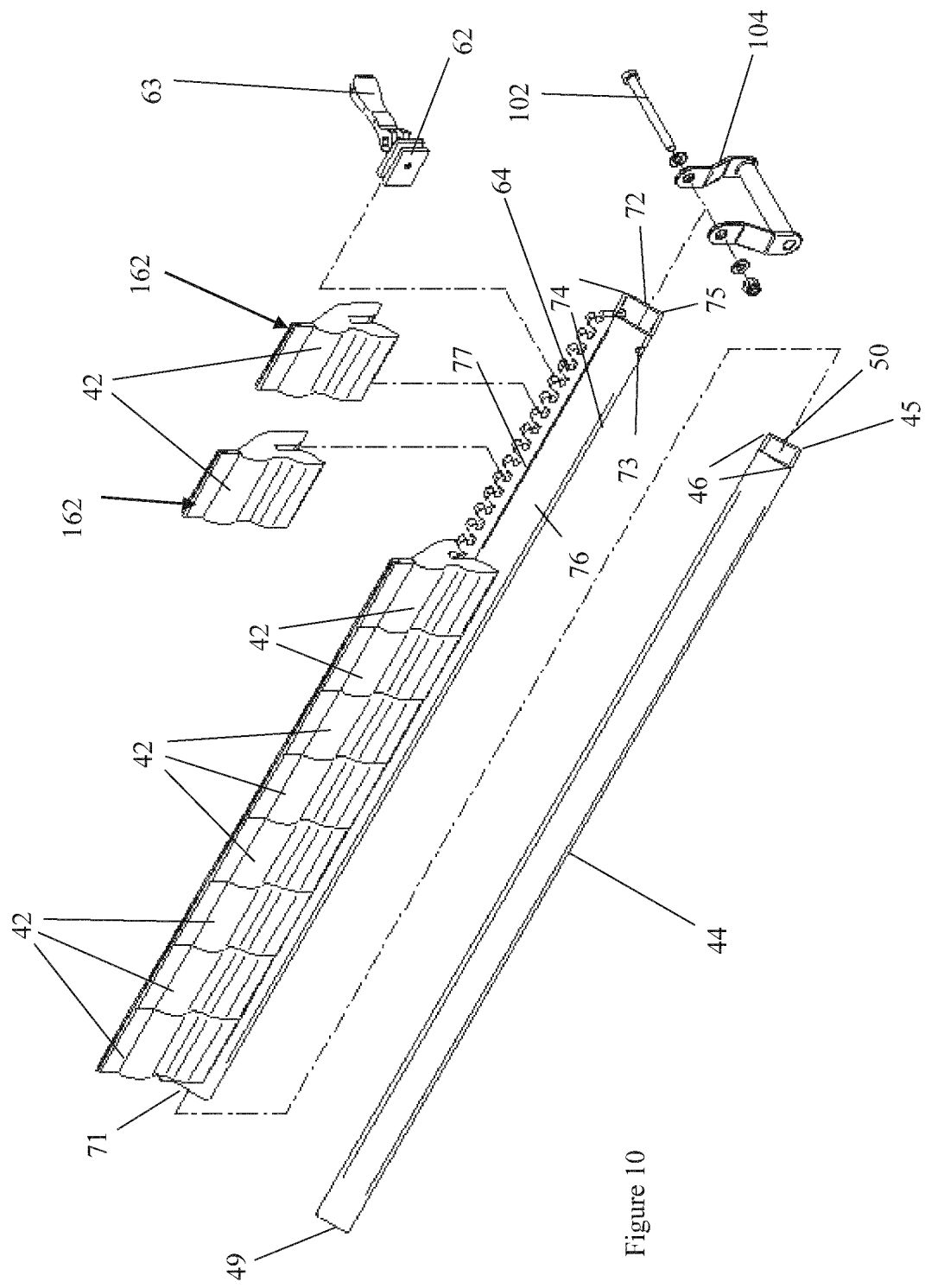
FIG. 10 is an exploded view of the conveyor belt cleaner of FIG. 1.

As shown in FIGS. 1, 2, 3, 6, 7 and 10 the cartridge 76 is adapted to receive the cross shaft 44 such that the external walls of the cross shaft 44 engage the internal walls of the cartridge 76 with a running fit such that the cross shaft 44 is slidable along the central axis with respect to the cartridge 76. However, the cartridge 76 cannot rotate about the central axis with respect to the cross shaft 44. Apertures 73 in side cartridge corners 74 are adapted to be aligned with the apertures (not shown) in side cross shaft corners 46 in the cross shaft 44 such that a fastener 102, such as a bolt as shown in FIGS. 1, 2 and 6, can be removably inserted therethrough to prevent sliding movement of the cartridge 76 with respect to the cross shaft 44. The fastener 102 attaches a generally U-shaped handle 104 to the second end 72 of the cartridge 76 such that the handle 104 is pivotal about the central axis of the fastener 102.

The top cartridge corner 77 of the cartridge 76 is fixedly connected to an engaging element 64 arranged to engage and retain scraper blades 42. The engaging element 64 is in the form of an angled locking tooth profile, where each tooth is angled away from the normal to the extension of the longitudinal extension of the cartridge 76. Adjacent teeth in the angled locking tooth profile of the engaging element 64 include a space between them arranged to receive restraining pin 49a in a scraper blade 42. It is within the scope of the present invention for scraper blades 42 to include multiple restraining pins 49a arranged to be received in multiple spaces between teeth. The engaging element 64 additionally acts as a stiffener for the cartridge 76.

The cartridge 76 and cross shaft 44 may be made from metal materials such as steel, aluminum or stainless steel, or from rigid plastic materials.

Figure 4:
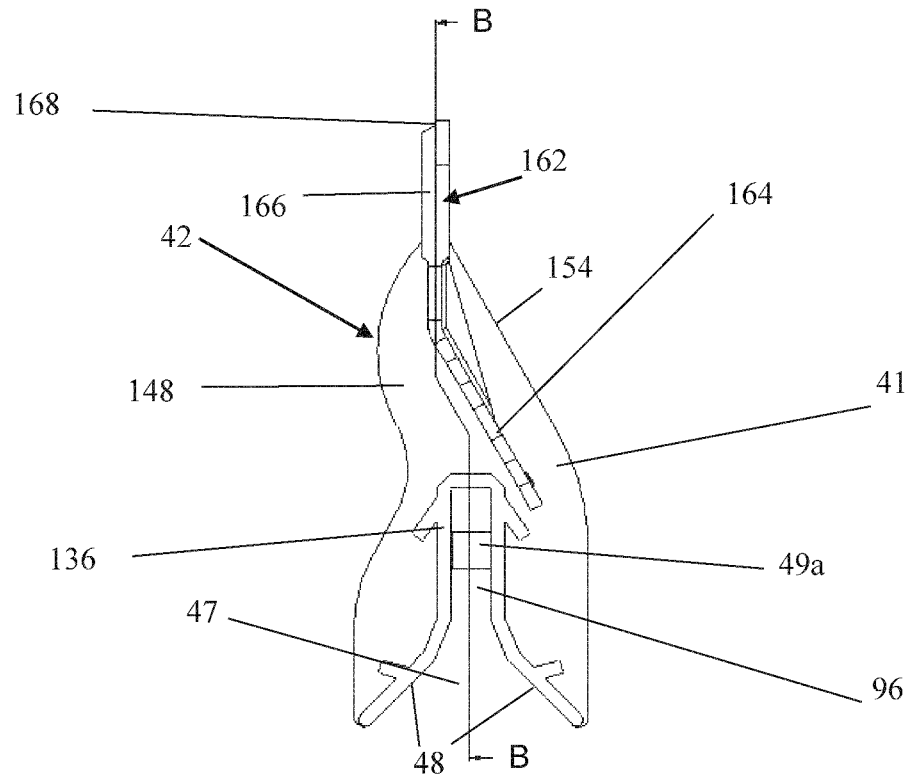
FIG. 4 is an end view of a blade of the conveyor belt cleaner of FIG. 1.
Figure 5:
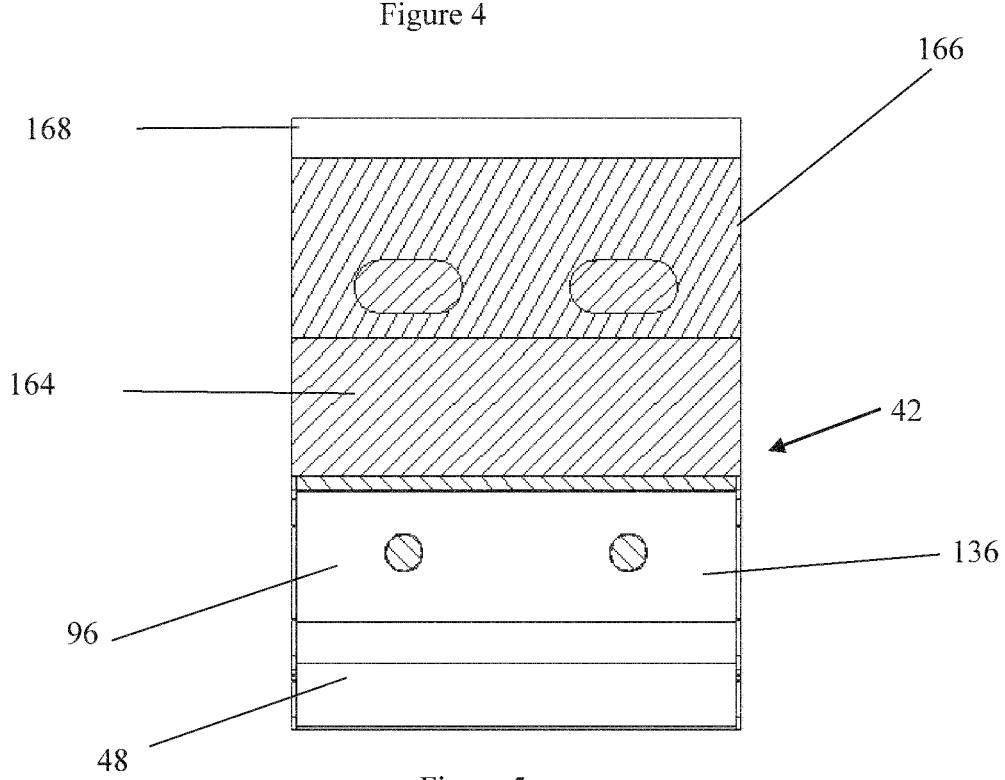
FIG. 5 is a view along lines B-B in FIG. 4.

The scraper blade 42 as best shown in FIGS. 2, 4 and 5 includes a mounting base 48. The mounting base 48 forms space 47 and is angles to sit on and be supported by the surfaces of the cartridge 76 extending away from the top cartridge corner 77. Space 47 extends upwards into space 96, being framed by vertical frame 136. Space 96 includes restraining pin 49a and is shaped to receive engaging element 64. Restraining pin 49a is arranged to be received in the space between adjacent teeth in the engaging element 64.

In one embodiment, the mounting base 48 and vertical frame 136 are constructed of a corrosion resistant alloy steel amalgamated with an elastomeric material. The body 41 of scraper blade 42 has a surface without horizontal surfaces so that material cannot dwell and collect on the surface of the scraper blade, thus avoiding the buildup of material.

The scraper blade 42 also includes an upwardly extending arm 148. The arm 148 includes a bottom end 150 and a top end 152. The arm 148 is disposed at an angle of approximately thirty degrees to vertical as shown in FIGS. 2 & 4. The body 41 is preferably formed from a resilient elastomeric material such as urethane or rubber.

The scraper blade 42 also includes a scraping element 162 which is attached to the body 41. The scraping element 162 includes a generally planar lower portion 164 that is embedded within the body 41 and that is located generally parallel to the front surface 154. The lower portion 164 is disposed at an angle of approximately thirty degrees to vertical. The scraping element 162 also includes a generally planar upper portion 166 that extends generally vertically upwardly from the top end of the lower portion 164 as best shown in FIGS. 2 and 4 when the conveyor belt is not applying a horizontal force to the scraping element 162. The upper portion 166 of the scraping element 162 includes a bottom end that is embedded within the arm 148. The upper portion 166 extends to a scraping tip 168 that is adapted to engage an outer surface of the conveyor belt. As shown in FIGS. 2 and 4, the front surface 154 of the arm 148 is generally planar from the upper portion 166 of the scraping element 162 to the end of the second apron 142. The scraping element 162 is preferably made from metal such as tool steel or tungsten carbide.

FIGS. 6, 7, 8 and 9 illustrate a second embodiment of the mounting assembly 11 that used a scraper blade 42 without mounting base 48. For convenience features of the second embodiment that are similar or correspond to features of the first embodiment have been referenced with the same reference numerals. The blade base 248 forms space 47 and is angles to sit on and be supported by the surfaces of the cartridge 76 extending away from the top cartridge corner 77. Space 47 extends upwards into space 96. Space 96 includes restraining pin 49a and is shaped to receive engaging element 64. Restraining pin 49a is arranged to be received in the space between adjacent teeth in the engaging element 64.

In this embodiment, the blade base 248 is part of the scraper blade 42 body and is constructed of the same material. The body 41 of scraper blade 42 has a surface without horizontal surfaces so that material cannot dwell and collect on the surface of the scraper blade, thus avoiding the buildup of material.

As best shown in FIGS. 1, 2, 3 and 6, one or more scraper blades 42 are slidably and removably mounted to the engaging element 64 of the cartridge 76. A locking means 63 is mountable to the teeth of engaging element 64 of the cartridge 76 at the end most scraper blade 42 in the direction of the extension of the teeth. In one embodiment the locking means 63 is a cam lock. The locking means 63 includes a mounting flange 62 comprising opposed plates and a pin that passes between the mounting plates. The pin is arranged to sit in the space between teeth of the engaging element and abut the end of the opposed plates against the end most scraper blade 42. The locking means 63 includes a lever arm which extends from the mounting flange 62 and is arranged to bring the opposed plated together and fix the locking means 63 in place as a cam lock.

The skilled addressee will recognize that a screw, bolt, rivet or otherwise can be used to bring the opposed plates together and fix the locking means in place alternatively to the described cam lock and still fall within the scope of the present invention.

In use, when the scraper blades 42 become worn, damaged, or otherwise require service, the cross shaft 44, cartridge 76 and scraper blades 42 are lowered out of engagement with the moving conveyor belt 30. The locking means 63 loosens the connection to the engaging element 64, such that the locking means 63 can be removed from the teeth of the engaging element 63 and the engagement with the end most scraper blade 42. With the locking means removed the end most scraper blade 42 can now move the restraining pin 49*a* along the space between teeth and remove the end most scraper blade 42. The procedure is repeated for each scraper blade 42. The scraper blades 42 may then be removed and replaced from the cartridge 76. Once the scraper blades 42 have been replaced or repaired, the cartridge 76 and the scraper blades 42 mounted thereon can be reinstalled.

As shown in FIGS. 2 and 4, when the scraper blade 42 is in a relaxed position or is disengaged from the conveyor belt, the upper portion 166 of the scraping element 162 is substantially vertical.

Various features of the invention have been particularly shown and described in connection with the illustrated embodiments of the invention, however, it must be understood that these particular arrangements merely illustrate, and that the invention is to be given its fullest interpretation within the terms of the appended claims.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A scraper blade mounting assembly for a conveyor belt cleaner comprising;
    a plurality of scraper blades;
    a support cartridge arranged to removingly fix the plurality of scraper blades;
    wherein a top surface of the support cartridge includes an engaging means projecting upwards from the top surface of the support cartridge for receiving at least one of the plurality of scraper blades;
    wherein the engaging means is arranged to restrain sliding movement of the plurality of scraper blades along the length of the support cartridge;
    wherein a bottom surface of each of the plurality of scraper blades is profiled to extend along two surfaces of the support cartridge; and
    wherein the two surfaces of the support cartridge are angled away from the top surface.

2. The scraper blade mounting assembly for a conveyor belt cleaner as claimed in claim 1, wherein the engaging means includes a plurality of teeth extending from the top of the support cartridge and angled with respect to the longitudinal extension of the support cartridge.

3. The scraper blade mounting assembly for a conveyor belt cleaner as claimed in claim 2, wherein the engaging means includes a space between adjacent teeth of the plurality of teeth; and
    wherein the space is arranged to receive a pin in the base of the at least one scraper blade to retain the at least one scraper blade on the engaging means.

4. The scraper blade mounting assembly for a conveyor belt cleaner as claimed in claim 1, further comprising a locking means, wherein the locking means is arranged to engage one end of the at least one scraper blade to fix the at least one scraper blade in place.

5. The scraper blade mounting assembly for a conveyor belt cleaner as claimed in claim 4, wherein the locking means is a cam lock.

6. The scraper blade mounting assembly for a conveyor belt cleaner as claimed in claim 1, wherein the support cartridge has a square tube profile; and wherein a corner of the square tube profile includes the engaging means.

7. The scraper blade mounting assembly for a conveyor belt cleaner as claimed in claim 1, wherein the at least one scraper blade includes no horizontal surfaces in use.

8. The scraper blade mounting assembly for a conveyor belt cleaner as claimed in claim 1, wherein the at least one scraper blade includes a base arranged to abut two surfaces of the support cartridge in use.

9. The scraper blade mounting assembly for a conveyor belt cleaner as claimed in claim 8, wherein a recess extends from the base; and wherein the recess is arranged to receive the engaging means in use.

10. The scraper blade mounting assembly for a conveyor belt cleaner as claimed in claim 3, wherein the pin is located in a recess.

11. The scraper blade mounting assembly for a conveyor belt cleaner as claimed in claim 1, wherein the scraper blade includes:
    a body portion;
    a bottom surface; and
    a scrapping element;
    wherein the bottom surface includes a region that extends into the scraper blade as a channel;
    wherein a pin extends between the sides of the channel.

12. The scraper blade mounting assembly for a conveyor belt cleaner as claimed in claim 11, wherein the bottom surface includes a mounting base.

13. The scraper blade mounting assembly for a conveyor belt cleaner as claimed in claim 12, wherein the mounting base is made of metal.

14. The scraper blade mounting assembly for a conveyor belt cleaner as claimed claim 11, wherein the bottom surface includes regions angled away from the channel.

15. The scraper blade mounting assembly for a conveyor belt cleaner as claimed in claim 14, wherein the regions angled away from the channel are arranged to conform to two adjacent sides of a support cartridge.

16. The scraper blade mounting assembly for a conveyor belt cleaner as claimed in claim 11 further comprising a scraping element extending from the body portion distal to the bottom surface.

17. The scraper blade mounting assembly for a conveyor belt cleaner as claimed in claim 16, wherein the scraping element includes a lower portion embedded in the body portion angled to the vertical and an upper portion that extends vertically outwards from the body portion.

18. The scraper blade mounting assembly for a conveyor belt cleaner as claimed in claim 17, wherein the upper portion includes a tip arranged to engage a surface for scraping.

19. A locking mechanism for engaging the scraper blade mounting assembly as claimed in claim 1 comprising:
- opposed plates arranged to receive the engaging means between the opposed plates;
- a pin passing between the opposed plates; and
- a lever arm connected to one of the opposed plates;
- wherein the lever arm is arranged to bring the opposed plates together locking the engaging means between the opposed plates.

* * * * *

UNITED STATES PATENT AND TRADEMARK OFFICE
CERTIFICATE OF CORRECTION

| | |
|---|---|
| PATENT NO. | : 12,037,202 B2 |
| APPLICATION NO. | : 17/781079 |
| DATED | : July 16, 2024 |
| INVENTOR(S) | : Michael James Hutton and Kenneth Andrew Minch |

It is certified that error appears in the above-identified patent and that said Letters Patent is hereby corrected as shown below:

On the Title Page

Item (57) "Abstract" last two lines change "movement of the at least one along the length of the support cartridge." to -- movement of at least one scraper blade along the length of the support cartridge. --.

In the Specification

Column 2, Lines 35-36, change "FIG. 1 is a front view of a conveyor belt cleaner according an embodiment of the..." to -- FIG. 1 is a front view of a conveyor belt cleaner according to an embodiment of the... --.

Column 2, Lines 61-62, change "a conveyor belt cleaner of the present invention, as shown in FIG. 1, is adapted to be ..." to -- a conveyor belt cleaner of the present invention, and as shown in FIG. 1, is adapted to be ... --.

Column 3, Lines 59-60, change "...The mounting base 48 forms space 47 and is angles to sit on and be supported by the" to -- ...The mounting base 48 forms space 47 and is angled to sit on and be supported by the --.

Column 4, Line 40, change "angles to sit on and be supported by ..." to -- angled to sit on and be supported by..." --.

Column 4, Lines 66-67, change "to bring the opposed plated together and fix the locking means 63 in place as a cam lock." to -- to bring the opposed plates together and fix the locking means 63 in place as a cam lock. --.

In the Claims

Column 5, Line 52, Claim 1, change "cleaner comprising;" to -- cleaner comprising: --.

Signed and Sealed this
Seventh Day of January, 2025

Derrick Brent
*Acting Director of the United States Patent and Trademark Office*

Column 6, Line 55, Claim 14, change "belt cleaner as claimed claim 11, wherein the bottom surface" to -- belt cleaner as claimed in claim 11, wherein the bottom surface --.